Oct. 3, 1950 O. H. SCHMITT 2,524,211

RADIO-FREQUENCY GENERATOR

Filed Feb. 6, 1947

INVENTOR.
OTTO H. SCHMITT

BY M. C. Hayes

ATTORNEY

Patented Oct. 3, 1950

2,524,211

UNITED STATES PATENT OFFICE 2,524,211

RADIO-FREQUENCY GENERATOR

Otto H. Schmitt, Mineola, N. Y., assignor to the United States of America as represented by the Secretary of the Navy Application February 6, 1947, Serial No. 726,931

4 Claims. (Cl. 250—36)

The present invention relates to radio-frequency generators. The object is to devise automatic control means to maintain the power output of a radio-frequency generator constant within narrow limits.

For various reasons, especially where the operating frequency is changed, it is a characteristic of radio-frequency power oscillators and driver-amplifier combinations to yield a varying output. This is particularly true in the case of triode circuits in the frequency range where the inter-electrode capacity is an important part of the tuned and excitation circuits. Even with a carefully designed radio-frequency section having the customary adjustment controls, there is an inherent tendency of the generator to vary in radio-frequency output. There is usually a pronounced variation incidental to frequency changes.

According to the present invention, an automatic, efficient and effective modification of the usual power input circuit from an alternating-current source is proposed. A reactor, preferably a fixed, unsaturated inductor, is connected in series with the alternating-current generator input circuit, the reactance of the inductor at the operating frequency of the generator input circuit being made to equal the effective resistance of the radio frequency generator (including its rectifier) when the generator consumes rated or any arbitrarily chosen peak power.

Another object is, therefore, to provide a novel input circuit arrangement for a generator of radio frequency energy, which circuit consists in a reactor serially connected to said generator and having a reactance value comparable to the effective resistance of the generator.

The invention will be better understood from the following detailed disclosure in which.

Figures 1, 2:
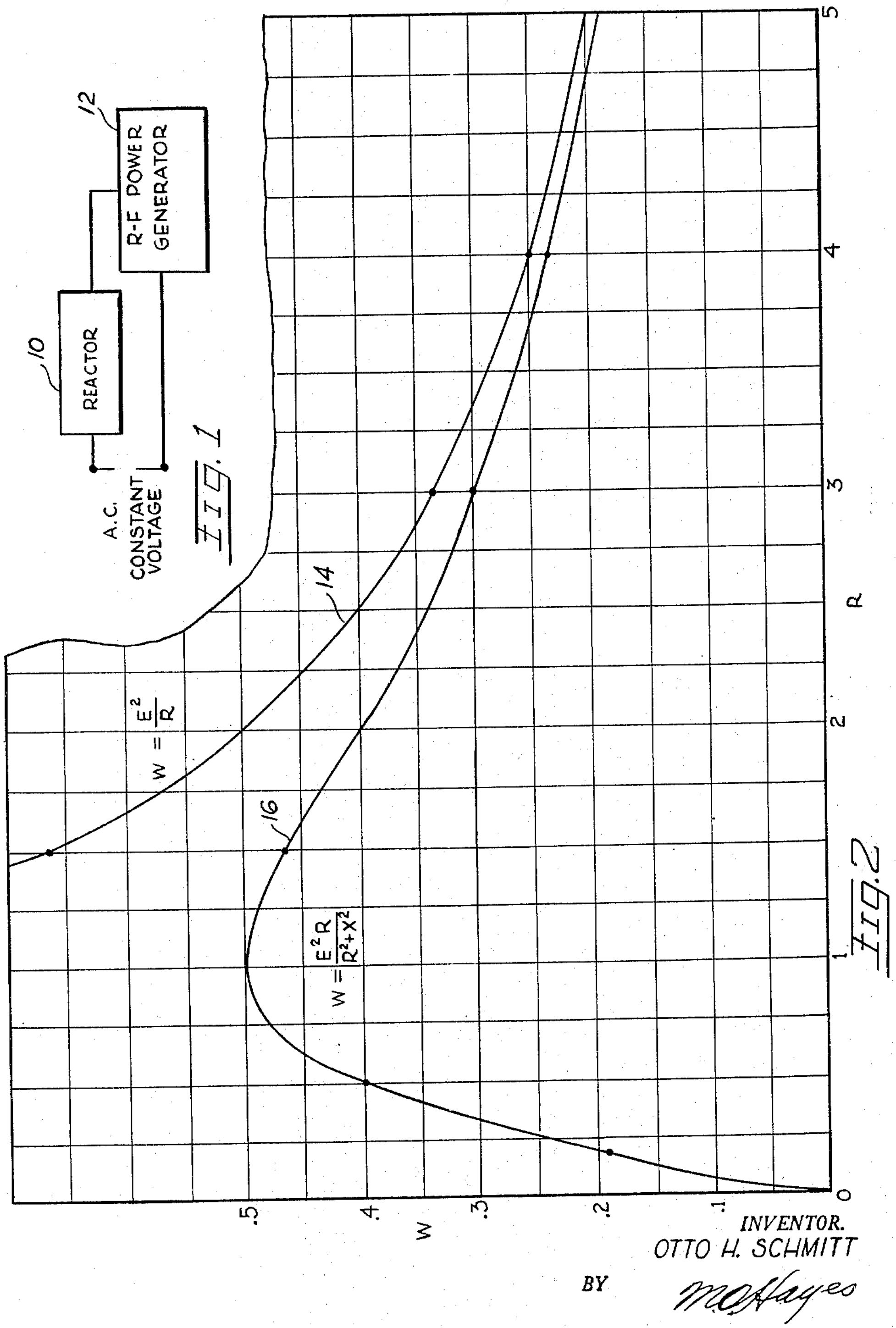
Fig. 1 is a block diagram illustrating the invention.
Figure 2 is a graph showing the comparative performance of the radio-frequency generator with and without the series reactor.

Fig. 1 discloses a reactor 10 connected in series with radio-frequency generator 12, the series circuit being connected to a conventional, constant-voltage, alternating-current power source. In Fig. 2 there are shown two curves. Based on a conventional arrangement which lacks a series reactor, curve 14 represents the variations in calculated power consumption plotted against effective resistance of the radio-frequency generator from zero upwards. This curve is calculated from the expression $$W=\frac{E^2}{R}$$

Curve 16 shows the variation in power consumed when a fixed series reactor is used and the relative effective resistance varies from zero upwards, calculated from the expression $$W=\frac{E^2R}{R^2+X^2}$$

In these expressions, E is the A.-C. source voltage, R is the alternating-current input circuit resistance, X is the input circuit reactance and W is the consumed power. It is desirable that the generator output (and consequently its power consumption) be held reasonably constant for as wide a range of variation as possible in effective resistance. Curve 16 shows that, though the relative effective resistance drops 50 per cent from unity or increases 100 per cent, there is a decrease in peak power of only 20 per cent. Regarded differently, there is approximately a 10 per cent variation in power about a mean (where W=0.45) for a 300 per cent increase in relative resistance above 0.5. At no part of curve 14 can this regulation be even approached.

To improve the rectifier and filter action of the radio-frequency generator power supply, the reactor used preferably is an inductor. This has a certain amount of resistance, and the radio-frequency generator includes some small amount of reactance. These departures from curve 16 are of little moment, compared to the much more serious regulation effects in curve 14. The alternating-current voltage drop in the reactor is readily compensated for by appropriately proportioning the customary power transformer of the radio-frequency power generator. The inductor should have an air gap to prevent appreciable saturation. While use of an inductor adds bulk to the apparatus, it does not seriously impair the efficiency.

What is claimed is:

1. The series combination of a variable-frequency radio-frequency power generator designed for energization from an alternating-current source, and a reactor the reactance of which at the operating frequency of said source approximates the effective resistance presented to the alternating-current source when the generator consumes its maximum power, thereby to maintain the output of said generator substantially constant over a band of operating frequencies.

2. The series combination of a variable-frequency radio-frequency power generator designed for energization from an alternating-current source, and an unsaturated, fixed choke the reactance of which at the operating frequency of said source approximates the effective resistance presented to the alternating-current source when the generator consumes its maximum power, thereby to maintain the output of said generator substantially constant over a band of operating frequencies.

3. In combination, a generator of high-frequency electromagnetic oscillations, a source of alternating current for energizing said generator, and reactance means serially connected between said source and said generator and having a reactance value, at the operating frequency of said source, substantially equal to the effective input resistance of said generator.

4. The combination as defined in claim 3 wherein said reactance means comprises an air-gap inductor.

OTTO H. SCHMITT.

REFERENCES CITED

The following references are of record in the file of this patent:

UNITED STATES PATENTS

| Number | Name | Date |
|---|---|---|
| 2,055,591 | Rau | Sept. 29, 1936 |
| 2,377,456 | Spitzer | June 5, 1945 |

FOREIGN PATENTS

| Number | Country | Date |
|---|---|---|
| 415,464 | Great Britain | Aug. 27, 1934 |